US 7,730,466 B2

(12) United States Patent
Wilson

(10) Patent No.: US 7,730,466 B2
(45) Date of Patent: Jun. 1, 2010

(54) SYSTEM AND METHOD FOR MANIPULATING SOURCE CODE IN A TEXT EDITOR

(75) Inventor: Jeff K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 11/348,904

(22) Filed: Feb. 7, 2006

(65) Prior Publication Data

US 2007/0240101 A1    Oct. 11, 2007

(51) Int. Cl.
*G06F 9/44* (2006.01)
*G06F 9/45* (2006.01)

(52) U.S. Cl. .................. 717/141; 717/140; 717/145; 717/110; 717/112

(58) Field of Classification Search .............. 717/141, 717/140, 145, 110, 112
See application file for complete search history.

(56) References Cited

U.S. PATENT DOCUMENTS

| 6,457,176 | B1* | 9/2002 | King ........................... 717/173 |
| 6,647,408 | B1* | 11/2003 | Ricart et al. ................ 718/105 |
| 7,333,965 | B2* | 2/2008 | Tilford et al. ................ 706/20 |
| 7,343,597 | B1* | 3/2008 | Smith ........................... 717/151 |
| 2002/0128809 | A1* | 9/2002 | Roesner et al. ................ 703/17 |
| 2002/0169999 | A1* | 11/2002 | Bhansali et al. .............. 714/26 |
| 2005/0079478 | A1* | 4/2005 | McKeagney et al. ......... 434/350 |
| 2005/0246666 | A1* | 11/2005 | Kalinoski et al. ............ 715/963 |
| 2005/0278687 | A1* | 12/2005 | Madhavan .................. 717/100 |
| 2006/0015856 | A1* | 1/2006 | Lotter ........................ 717/136 |
| 2006/0080647 | A1* | 4/2006 | Bhansali et al. ............. 717/148 |
| 2006/0277209 | A1* | 12/2006 | Kral et al. ................... 707/102 |
| 2006/0277231 | A1* | 12/2006 | Kral et al. ................... 708/102 |

OTHER PUBLICATIONS

Griewank et al, "Algorithm 755: ADOL-C: A Package for the Automatic Differentiation of Algorithms Written in C/C11", ACM Transactions on Mathematical Software, vol. 22, No. 2, Jun. 1996, pp. 131-167.*
Yu et al, "Embedded Software Generation from System Level Design Languages", 2004, IEEE, pp. 463-468.*

* cited by examiner

*Primary Examiner*—Wei Y Zhen
*Assistant Examiner*—Charles Swift
(74) *Attorney, Agent, or Firm*—Suiter Swantz pc llo

(57) ABSTRACT

The present invention is a method for manipulating source code in a text editor, which includes receiving an input, the input designating an identifier. The method further includes associating a plurality of source code fragments with the identifier. Additionally, the method includes adding comment characters to each source code fragment of the plurality of source code fragments associated with the identifier.

1 Claim, 3 Drawing Sheets

SYSTEM AND METHOD FOR MANIPULATING SOURCE CODE IN A TEXT EDITOR

FIELD OF THE INVENTION

The present invention relates to the field of software interfaces for I/O and data entry and particularly to a system and method for manipulating source code in a text editor.

BACKGROUND OF THE INVENTION

When developing source code for a software program, such as in a text editor of an Integrated Development Environment (IDE), a developer may suspect that some portion(s) of the code are faulty (i.e., likely contain something that causes a certain error which prevents the program from executing properly). In such instances, the developer will typically utilize a commenting feature of the IDE to comment out the lines or blocks of code that are believed to be causing the problem. Commenting out the suspected faulty code fragments prevents those code fragments from being run when the IDE attempts to execute the program. This way, a developer can comment out the portion of the code he or she believes is faulty and test the remaining code by allowing the IDE to execute the program running only the remaining code. If the remaining code runs properly, the developer may ascertain that the error was caused by some portion of the commented out code, which the developer can fix at a later time. Once the commented out, faulty code is fixed, the developer can uncomment the previously faulty code, thereby allowing it to be run with the remaining code of the program.

Typically, a line or block of code is commented out by adding the required commenting characters to each line or block of code which the developer wants commented out. For example, in order to comment out a line of code in JAVA, a developer may add // at the beginning of the line. When commenting out a block of code, a developer may bracket the block of code with /* */. Possibly, there may be a number of related, faulty code fragments within a program that may be responsible for causing the same error(s). Further, these faulty code fragments may be scattered (i.e., non-adjacent) throughout the program text. For every non-adjacent line or block of code which the developer wants to comment out, currently he or she is typically required to go through manually and add the above-referenced characters to each line or block. Further, if the developer is able to fix the commented-out code, he or she may then wish to uncomment the code, so that it may be run with the remaining code when executing the program. Uncommenting code currently requires manual removal of the above-referenced characters from each line or block of code. If there are a large number of non-contiguous lines or blocks of faulty code which is related (ex.—responsible for causing the same error(s)), a developer may have to spend a significant amount of time locating and manually entering/removing the above-referenced commenting characters from the code in order to comment/uncomment each line or block of the faulty code. The time inefficiency is compounded if the program is being worked on by different developers of a development team at different times. For instance, when one of the developers wants to make edits to try and fix the faulty code fragments, he or she may be required to locate all of the related, faulty code fragments and manually comment out/edit/uncomment each one.

Therefore, it may be desirable to have a system and method for manipulating source code in a text editor of an Integrated Development Environment (IDE) which addresses the above-referenced problems and limitations of the conventional solutions.

SUMMARY OF THE INVENTION

Accordingly, an embodiment of the present invention is directed to a method for manipulating source code in a text editor, which includes receiving an input, the input designating an identifier. The method further includes associating a plurality of source code fragments with the identifier. Additionally, the method includes adding comment characters to each source code fragment of the plurality of source code fragments associated with the identifier.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
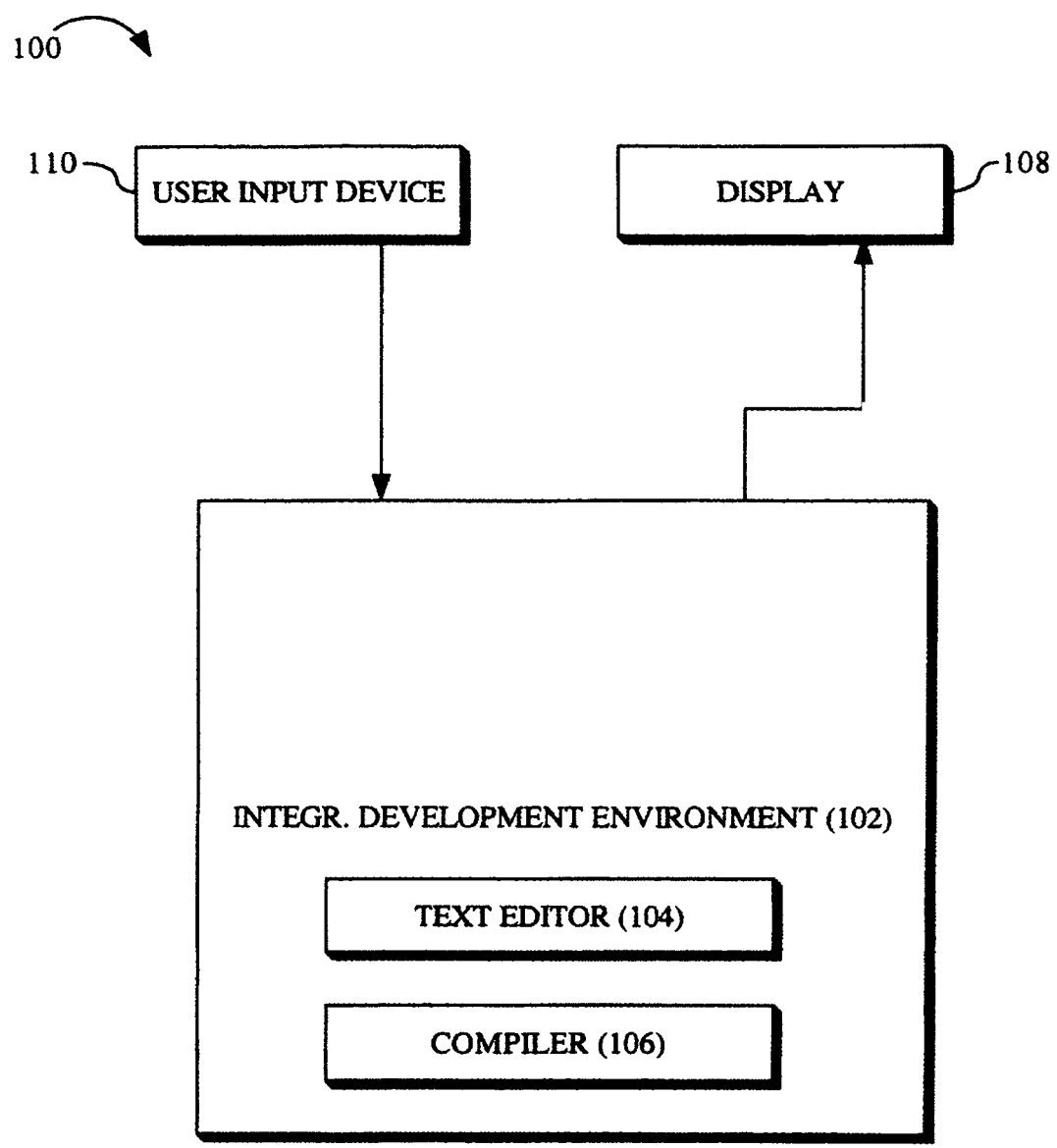
FIG. 1 is an illustration of a system for manipulating source code in accordance with an exemplary embodiment of the present invention.

FIG. 1 illustrates a system for manipulating source code 100. In a present embodiment, the system 100 may include an Integrated Development Environment (IDE) 102. The Integrated Development Environment may include a text editor 104, a compiler 106 and/or an interpreter (interpreter not shown), build automation tools (not shown) and a debugger (not shown). It is contemplated that the Integrated Development Environment of the present invention may be configured in any of a number of known configurations in the art. It is further contemplated that the system 100 may include any of the above-listed components, such as a text editor, either alone or in combination, and implemented with or separate from the IDE. The system 100 may further include a display 108 and a user input device (ex.—mouse, keyboard) 110, which are communicatively coupled to the IDE 102.

Figure 2:
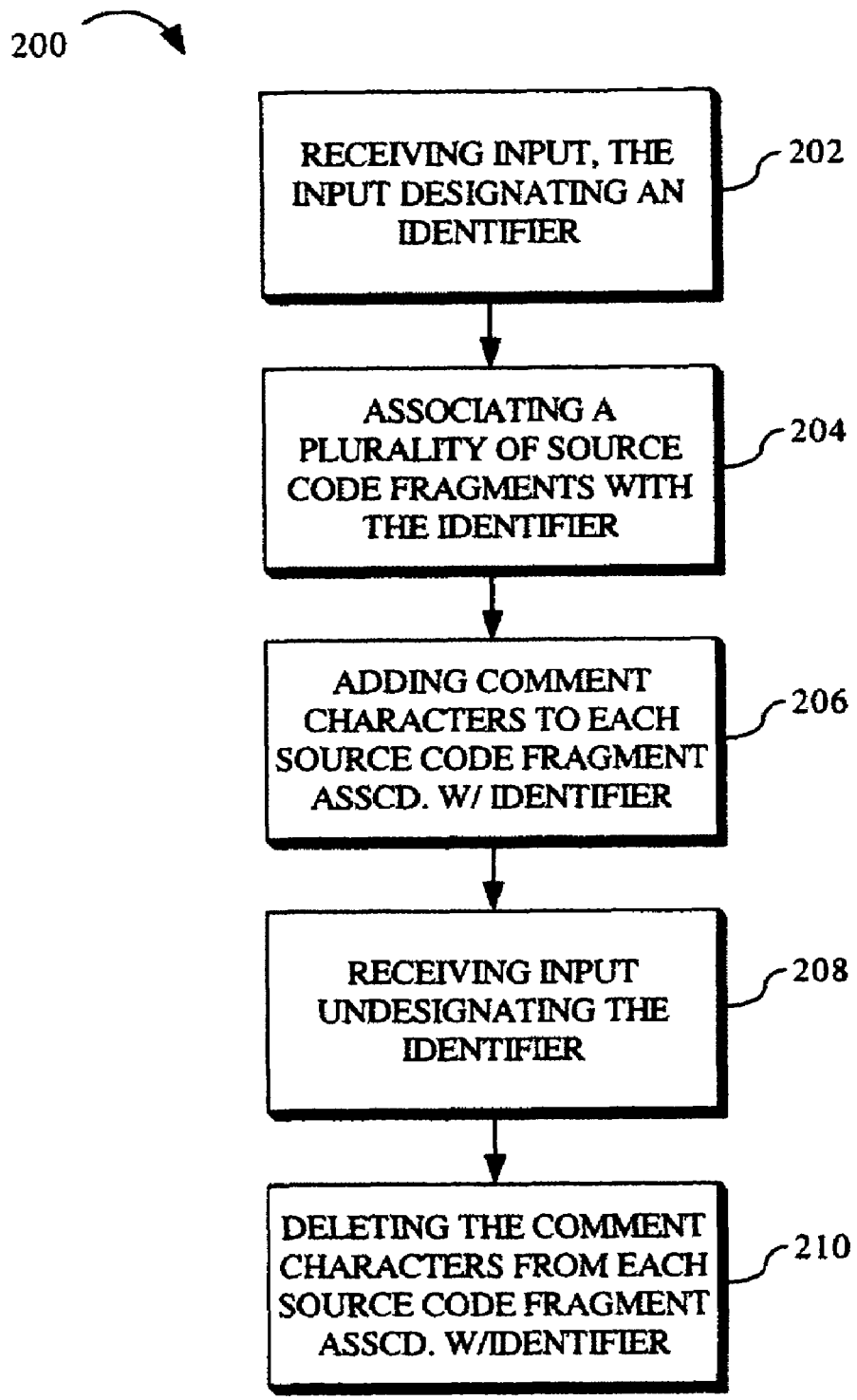
FIG. 2 is an illustration of a method for manipulating source code in a text editor in accordance with an exemplary embodiment of the present invention.

FIG. 2 illustrates a method 200 for manipulating source code in a text editor. When developing source code for a software program, a user may determine that one or more fragments (line(s)/block(s)) of the source code are possibly faulty (i.e., causing an error that is preventing the program from executing properly). Further, the faulty source code fragments may be related (ex.—responsible for causing the same error). The user may decide to comment out (via a commenting feature) the source code fragments suspected of being faulty, so that the program may be tested without running those code fragments. For example, a user may select one or more related, non-adjacent, source code fragments to comment out by utilizing a user input device (ex.—a mouse) 110 of the system 100 of the present invention to activate a highlighting function of the text editor 104. At this point, the method 200 may include the step of the system 100 receiving an input from the user designating an identifier 202. For example, the user may input the identifier via text entry. The identifier may be any title, name, portion of meta data, or the like selected by the user to classify the selected source code fragments. It is further contemplated that the input 202 received by the system 100 may be input by a source other than a user.

In an exemplary embodiment, the method 200 may further include the step of associating a plurality of source code fragments with the identifier 204. For instance, the identifier designated by the user in the previous step may be associated or linked with each of the plurality of source code fragments which were selected by the user to be commented out. Preferably, the associating step 204 is performed by the text editor 104. Alternatively, the associating step 204 may be performed by an application of the Integrated Development Environment (IDE).

In a present embodiment, the method 200 may further include the step of adding comment characters to each source code fragment of the plurality of source code fragments associated with the identifier 206. For example, comment characters, such as // for a line of code or /* */ for a block of code are added to the source code so as to comment out the source code fragments, so that the commented out source code fragments are not run by the compiler 106 during testing of the program. In further embodiments, the comment characters may include the identifier. In still further embodiments, the comment characters may include meta data, which provides such information as: date/time the source code fragment was commented out, name of developer, nature of the code fragment, or the like. The present invention thus allows a plurality of related, non-adjacent source code fragments to be commented out, via a simple input 202, as a set, rather than requiring the user to manually add comment characters to each source code fragment he or she wants to comment out. Once the source code fragments have had the comment characters added to them (i.e., have been commented out), the user/developer may then attempt to fix the code fragments by making edits to the code fragments, as occurs with typical commenting practice. Further, the user/developer may wish to add meta data, which may include notes/information documenting what was done with the code, comments concerning the nature of the code, or the like. Such information may be useful to that or another developer who works on the code at a later time.

In an exemplary embodiment of the present invention, the method 200 may further include the step of receiving an additional input from a user, the input undesignating the identifier 208. For instance, upon completing edits to the commented out source code fragments, a developer may wish to uncomment the source code fragments, so that they may be run by the compiler 106, with the remaining source code to determine if the program will run properly (i.e., without error). By undesignating the identifier, via the user input 110, the user is essentially able to uncomment the previously commented out source code fragments. The input undesignating the identifier may be accomplished by a single button click, such as by selecting the identifier from a user interface menu. In further embodiments, a user may enter the input undesignating the identifier 208 by highlighting the plurality of commented out source code fragments associated with the identifier and making a selection via a toolbar button or a context menu. It is further contemplated that the received input 208 may be entered/input by a source other than a user.

In the present embodiment, the method 200 further includes the step of deleting comment characters from each source code fragment of the plurality of source code fragments associated with the identifier 210. For example, comment characters, such as // for a line of code or /* */ for a block of code may be deleted from each source code fragment of the plurality of source code fragments associated with the identifier, so as to uncomment the source code fragments, so that the uncommented source code fragments may be run by the compiler 106 when running/testing the program including said fragments. In further embodiments, the comment characters may include the identifier. In still further embodiments, the comment characters may include meta data, which provides such information as: date/time the source code fragment was commented out, name of developer, nature of the code fragment, or the like. The present invention thus allows a plurality of related, non-adjacent source code fragments to be uncommented, via a simple input 202, as a set, rather than requiring the user to manually delete comment characters from each source code fragment he or she wants to uncomment. The above-referenced ability to automatically toggle comments on and off (to comment out/uncomment) for a set of source code fragments, rather than having to add/delete comments manually may make testing of code during program creation much more efficient.

Figure 3:
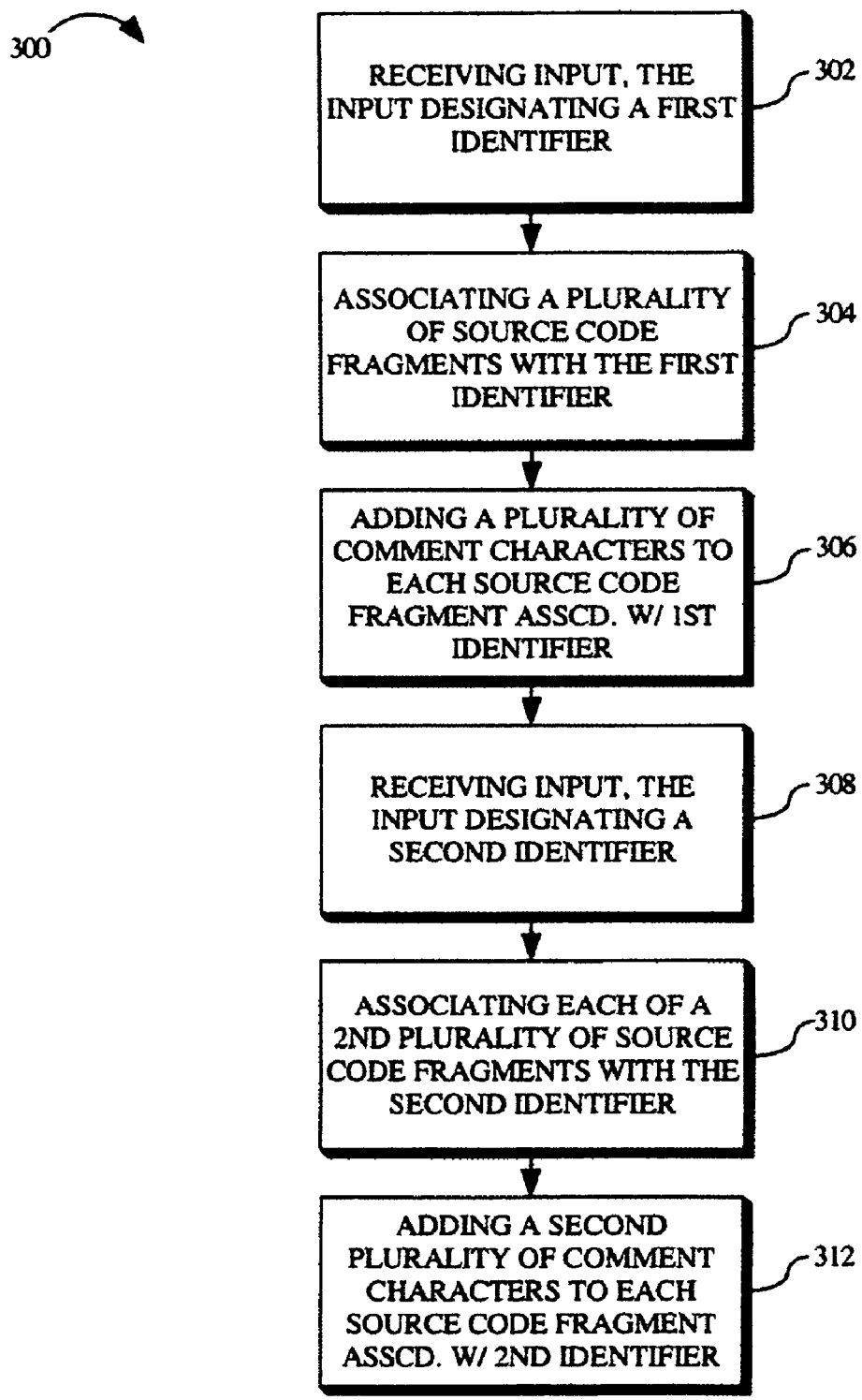
FIG. 3 is an illustration of a method for manipulating source code in a text editor in accordance with an exemplary embodiment of the present invention.

In an exemplary embodiment, as shown in FIG. 3, a method 300 of the present invention may include the steps of: receiving an input from a user, the input designating an identifier 302; associating a plurality of source code fragments with the identifier 304; and adding comment characters to each source code fragment of the plurality of source code fragments associated with the identifier 306. The above-referenced steps (302, 304 and 306 may be carried out in a similar manner as discussed for steps 202, 204 and 206 of method 200 above. However, the method 300 of the exemplary embodiment of the present invention may further include the step of receiving an input from a user, the input designating a second identifier, the second identifier being distinct from the first identifier 308. The input designating the second identifier may be entered by the user and received by the system in the same manner as described above for the first identifier. The method may further include the step of associating each source code fragment of a second plurality of source code fragments with the second identifier 310. Preferably, associating step 310 is performed by the text editor 104. Alternatively, associating step 310 may be performed by an application of the Integrated Development Environment (IDE). Further, the method 300 may include the step of adding comment characters to each source code fragment of the second plurality of source code fragments associated with the second identifier 312. For example, a developer who is testing source code for a software program may determine that a second set/plurality of source code fragments, distinct from the first set/plurality of code fragments, is responsible for a second error occurring within the program, the second error being distinct from the first error. Further, the developer may want to comment out/uncomment the second plurality of code fragments as a set, separate from the first plurality of code fragments. In further embodiments, a user may uncomment the second plurality of code fragments associated with the second identifier in a similar manner as when uncommenting the first plurality of code fragments associated with the first identifier. For example, a user may undesignate the second identifier by selecting the second identifier from a user interface or context menu including a plurality of identifiers.

In further embodiments, the step of receiving an input undesignating the identifier 208 may be achieved by receiving a user input entered via a user interface menu which displays each of a plurality of source code fragments associated with the identifier that have had comment characters added to them (i.e., have been commented out). For example, the menu may display said commented out fragments in a reporting style, listing information such as when said fragments were commented out, why they were commented out, the developer who commented them out, or the like.

In alternative embodiments, the step of receiving an input designating an identifier (202, 302) may be achieved in a different manner. For example, a user may select a plurality of related, non-adjacent source code fragments which happen to include an If statement, method, try catch blocks or the like. Upon highlighting the source code, the user may provide an input designating an identifier. Once the input is received (202, 302) by the system 100, the user may be presented with a menu prompting the user to select which portion of each fragment he or should would like comment characters to be added to (i.e., would like commented out). For example, the menu may present a list providing the user with a choice to only comment out the If statement, the method, etc. In further embodiments, the menu may be presented in various formats, such as allow a user to click on a choice presented in list format or to move a cursor along a series of choices presented in a tree-like format.

In further embodiments, the system 100 may be configured so that any edits, meta data, etc., made to one code fragment of a plurality of related, non-adjacent, commented out source code fragments may be applied to each code fragment of the plurality of source code fragments via receipt of a user selection from a tool bar button, menu or the like.

It is contemplated that the term manipulating source code, as used above is intended to encompass, but is not limited to, adding comments or meta data to source code, commenting out source code and uncommenting source code.

It is further contemplated that any one or more of the steps of the above-referenced methods 200, 300 may be performed by the text editor 104 (within or outside of the Integrated Development Environment), the Integrated Development Environment 102, and/or any one or more of a variety of applications known in the art implemented with or separate from the Integrated Development Environment 102.

It is contemplated that the invention may take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

It is further contemplated that the medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, and the like) may be coupled to the system either directly or through intervening I/O controllers.

Network adapters may also be coupled to the system to enable the data processing system to become couple to other data processing systems or storage devices through intervening private or public networks. Modems, cable modem and Ethernet cards are just a few of the currently available types of network adapters.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages is to be understood by the foregoing description, and it is apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for manipulating source code of a program via a text editor of a system, comprising steps of:

step 1, receiving a user-provided input, the input designating an identifier, the identifier including metadata;

step 2, automatically associating a plurality of user-selected source code fragments of the program with the identifier;

step 3, automatically adding a plurality of comment characters to the plurality of user-selected source code fragments associated with the identifier;

step 4, executing the program by running remaining source code fragments of the program but not running the user-selected source code fragments;

step 5, receiving a user-provided edit input, said edit input being applied to the plurality of user-selected code fragments for editing the program;

step 6, receiving an additional user-provided input, the additional user-provided input undesignating the identifier;

step 7, deleting the plurality of comment characters from each source code fragment of the plurality of source code fragments associated with the identifier, wherein at least two source code fragments of the plurality of source code fragments are non-adjacent, the identifier being designated via selection from a list of identifiers displayed via a context menu and via text entry; and step 8, executing the edited program.

* * * * *